(12) United States Patent
Bennati et al.

(10) Patent No.: US 11,754,405 B2
(45) Date of Patent: *Sep. 12, 2023

(54) METHOD AND APPARATUS FOR TRAJECTORY ANONYMIZATION BASED ON NEGATIVE GAPPING

(71) Applicant: HERE Global B.V., Eindhoven (NL)

(72) Inventors: Stefano Bennati, Zürich (CH); Aleksandra Kovacevic, Wettswil (CH); Kai Pöthkow, Berlin (DE); Elena Mumford, Eindhoven (NL); Elena Vidyakina, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 398 days.

This patent is subject to a terminal disclaimer.

(21) Appl. No.: 17/111,183

(22) Filed: Dec. 3, 2020

(65) Prior Publication Data

US 2021/0372801 A1    Dec. 2, 2021

Related U.S. Application Data

(60) Provisional application No. 63/032,261, filed on May 29, 2020.

(51) Int. Cl.
*G01C 21/34* (2006.01)
*G06F 21/62* (2013.01)

(52) U.S. Cl.
CPC ..... *G01C 21/3407* (2013.01); *G06F 21/6254* (2013.01)

(58) Field of Classification Search
CPC .......... G01C 21/3407; G06F 21/6254
See application file for complete search history.

(56) References Cited

U.S. PATENT DOCUMENTS 9,727,976 B1 *   8/2017  Perkins ................ G06V 10/426
10,740,990 B1 *  8/2020  Craig ................ G06Q 10/06398
(Continued)

FOREIGN PATENT DOCUMENTS

CN    106650486 A    5/2017
CN    110121153 A    8/2019

OTHER PUBLICATIONS

Terrovitis et al., "Local Suppression and Splitting Techniques for Privacy Preserving Publication of Trajectories", Mar. 2017, IEEE Transactions on Knowledge and Data Engineering, retrieved from http://www.cs.uoi.gr/%7Enikos/seqprivacy_tkde.pdf, pp. 1-14.

*Primary Examiner* — Stephen T Gundry
(74) *Attorney, Agent, or Firm* — Peter H. Yu; HERE GLOBAL B.V.

(57) ABSTRACT

An approach is provided for probe trajectory anonymization using based on a negative gap. The approach involves, for example, receiving a probe trajectory generated from at least one sensor of a probe device. The approach also involves processing the probe trajectory to segment the probe trajectory into a first subtrajectory and a second subtrajectory based on a negative gap between the first subtrajectory and the second subtrajectory. The negative gap specifies an amount of overlap between the end of the first subtrajectory and the beginning of the second subtrajectory. The approach further involves assigning a first pseudonym (e.g., a first new probe identifier) to the first subtrajectory, and a second pseudonym (e.g., a second new probe identifier) to the second subtrajectory. The approach then involves providing the first subtrajectory and the second subtrajectory as a trajectory anonymization output.

18 Claims, 12 Drawing Sheets

(56) References Cited

U.S. PATENT DOCUMENTS

| | | | | |
|---|---|---|---|---|
| 11,404,167 B2* | 8/2022 | Kaberg | ............... | G16H 50/50 |
| 11,526,480 B2* | 12/2022 | Rolf | ............... | H04L 45/7459 |
| 2015/0363508 A1* | 12/2015 | Nandan | ............... | G06F 16/29 |
| | | | | 707/743 |
| 2017/0103654 A1* | 4/2017 | Gaebler | ............... | G08G 1/144 |
| 2017/0124115 A1* | 5/2017 | Duan | ............... | G06F 16/29 |
| 2017/0358204 A1* | 12/2017 | Modica | ............... | G08G 1/0129 |
| 2018/0220205 A1* | 8/2018 | Chai | ............... | H04Q 9/00 |
| 2018/0268168 A1* | 9/2018 | Herlocker | ............... | G06F 16/29 |
| 2019/0385093 A1* | 12/2019 | Vollmer | ............... | H04W 4/024 |
| 2020/0011684 A1* | 1/2020 | McErlain, II | ............... | G01C 21/32 |
| 2020/0068350 A1* | 2/2020 | Chai | ............... | H04W 4/027 |
| 2021/0165911 A1* | 6/2021 | Huang | ............... | G06F 16/906 |
| 2021/0176597 A1* | 6/2021 | Li | ............... | G01C 21/3815 |
| 2022/0225086 A1* | 7/2022 | Fu | ............... | H04W 12/02 |
| 2022/0238013 A1* | 7/2022 | Jonietz | ............... | G06F 16/29 |
| 2022/0266451 A1* | 8/2022 | Cristache | ............... | G05D 1/0297 |
| 2022/0321693 A1* | 10/2022 | Rumland | ............... | H04W 4/80 |
| 2022/0341217 A1* | 10/2022 | Cristache | ............... | G06N 5/02 |
| 2022/0358845 A1* | 11/2022 | Holmes | ............... | G08G 5/0039 |
| 2022/0392355 A1* | 12/2022 | Holmes | ............... | G01C 21/20 |
| 2023/0014580 A1* | 1/2023 | Zhu | ............... | G01C 21/206 |
| 2023/0049845 A1* | 2/2023 | Tran | ............... | G06F 3/017 |

* cited by examiner

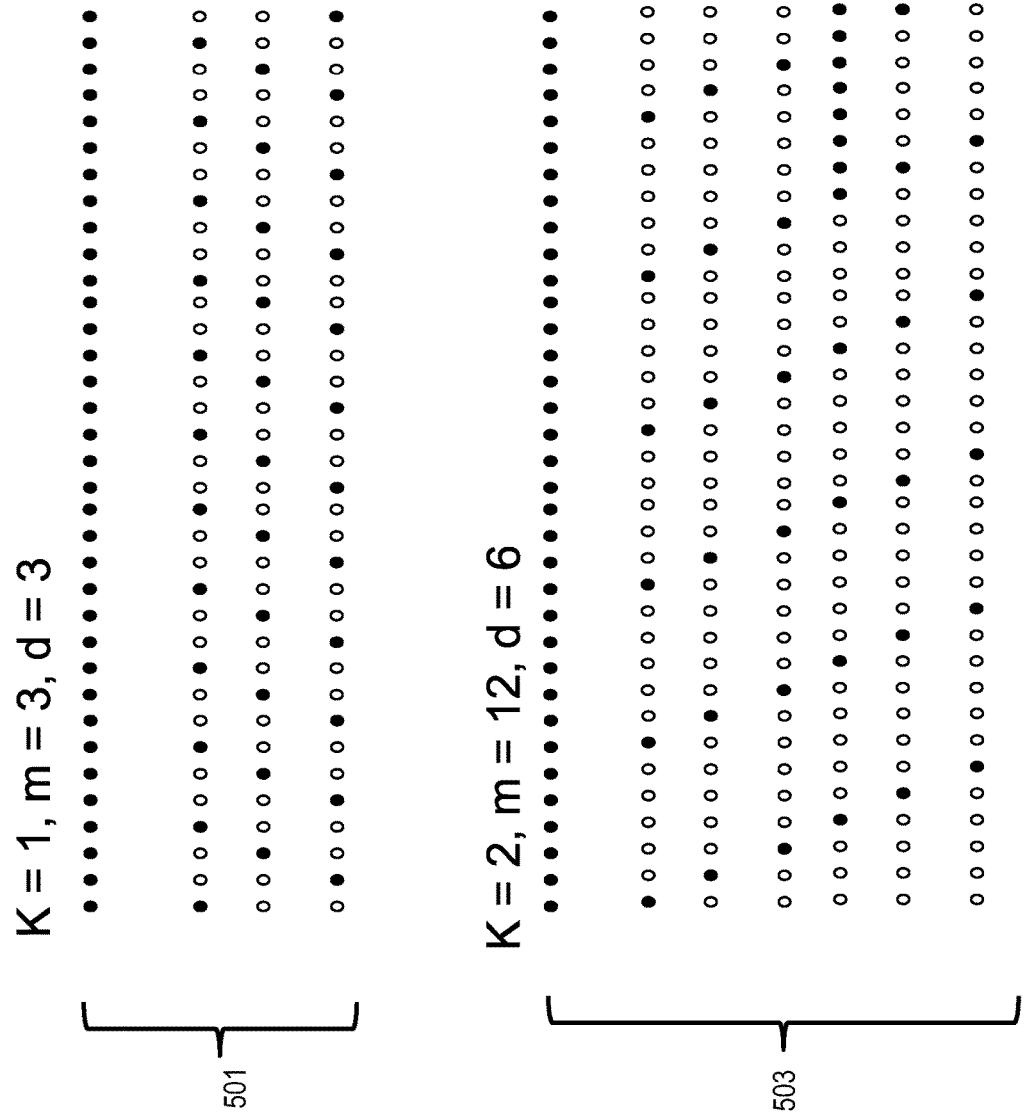

11,754,405 B2

METHOD AND APPARATUS FOR TRAJECTORY ANONYMIZATION BASED ON NEGATIVE GAPPING

RELATED APPLICATION

This application claims priority from U.S. Provisional Application Ser. No. 63/032,261, entitled "METHOD AND APPARATUS FOR TRAJECTORY ANONYMIZATION BASED ON NEGATIVE GAPPING," filed on May 29, 2020, the contents of which are hereby incorporated herein in their entirety by this reference.

BACKGROUND

The field of technology is privacy preserving data publishing. Location-based service providers historically collect location data to be used in their services and applications. Location data generally can be collected as a trajectory representing a sequence of data entries per individual moving entity (e.g., also referred to as a probe device such as a vehicle), where each entry consists of location (latitude, longitude), time stamp, a pseudonym (e.g., a unique probe identifier to indicate which of the entries belong to the same entity), and possibly various additional information about the entity at the time (e.g., vehicle sensor data, speed, heading etc.). However, location data is generally regarded as personal data, so that companies wanting to process personal location data often must employ anonymization of the trajectory data where the data cannot be attributed to an identifiable person or user. Accordingly, service providers face significant technical challenges to data anonymization to preserve privacy while also maintaining the utility of the data for providing services and applications.

Some Example Embodiments

Therefore, there is a need for an approach for trajectory anonymization that balances the privacy and utility of the data.

According to one embodiment, a method comprises receiving a probe trajectory generated from at least one sensor of a probe device. The method also comprises processing the probe trajectory to segment the probe trajectory into a first subtrajectory and a second subtrajectory based on a negative gap between the first subtrajectory and the second subtrajectory. The negative gap, for instance, specifies an amount of overlap between the end of the first subtrajectory and the beginning of the second subtrajectory. The method further comprises assigning a first pseudonym (e.g., a first new probe identifier) to the first subtrajectory, and a second pseudonym (e.g., a second new probe identifier) to the second subtrajectory. The method further comprises providing the first subtrajectory and the second subtrajectory as a trajectory anonymization output. In one embodiment, the negative gap and/or other anonymization parameters (e.g., trajectory length, trajectory sampling rate, etc.) can also be varied to generate the anonymization output.

According to another embodiment, an apparatus comprises at least one processor, and at least one memory including computer program code for one or more computer programs, the at least one memory and the computer program code configured to, with the at least one processor, cause, at least in part, the apparatus to receive a probe trajectory generated from at least one sensor of a probe device. The apparatus is also caused to process the probe trajectory to segment the probe trajectory into a first subtrajectory and a second subtrajectory based on a negative gap between the first subtrajectory and the second subtrajectory. The negative gap, for instance, specifies an amount of overlap between the end of the first subtrajectory and the beginning of the second subtrajectory. The apparatus is further caused to assign a first pseudonym (e.g., a first new probe identifier) to the first subtrajectory, and a second pseudonym (e.g., a second new probe identifier) to the second subtrajectory. The apparatus is further caused to provide the first subtrajectory and the second subtrajectory as a trajectory anonymization output. In one embodiment, the negative gap and/or other anonymization parameters (e.g., trajectory length, trajectory sampling rate, etc.) can also be varied to generate the anonymization output.

According to another embodiment, a computer-readable storage medium carries one or more sequences of one or more instructions which, when executed by one or more processors, cause, at least in part, an apparatus to receive a probe trajectory generated from at least one sensor of a probe device. The apparatus is also caused to process the probe trajectory to segment the probe trajectory into a first subtrajectory and a second subtrajectory based on a negative gap between the first subtrajectory and the second subtrajectory. The negative gap, for instance, specifies an amount of overlap between the end of the first subtrajectory and the beginning of the second subtrajectory. The apparatus is further caused to assign a first pseudonym (e.g., a first new probe identifier) to the first subtrajectory, and a second pseudonym (e.g., a second new probe identifier) to the second subtrajectory. The apparatus is further caused to provide the first subtrajectory and the second subtrajectory as a trajectory anonymization output. In one embodiment, the negative gap and/or other anonymization parameters (e.g., trajectory length, trajectory sampling rate, etc.) can also be varied to generate the anonymization output.

According to another embodiment, an apparatus comprises means for receiving a probe trajectory generated from at least one sensor of a probe device. The apparatus also comprises means for processing the probe trajectory to segment the probe trajectory into a first subtrajectory and a second subtrajectory based on a negative gap between the first subtrajectory and the second subtrajectory. The negative gap, for instance, specifies an amount of overlap between the end of the first subtrajectory and the beginning of the second subtrajectory. The apparatus further comprises means for assigning a first pseudonym (e.g., a first new probe identifier) to the first subtrajectory, and a second pseudonym (e.g., a second new probe identifier) to the second subtrajectory. The apparatus further comprises means for providing the first subtrajectory and the second subtrajectory as a trajectory anonymization output. In one embodiment, the negative gap and/or other anonymization parameters (e.g., trajectory length, trajectory sampling rate, etc.) can also be varied to generate the anonymization output.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 5 is a diagram illustrating an example parallel track approach to trajectory anonymization based on negative gapping, according to one embodiment;

DESCRIPTION OF SOME EMBODIMENTS

Examples of a method, apparatus, and computer program for providing trajectory anonymization based on negative gapping are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
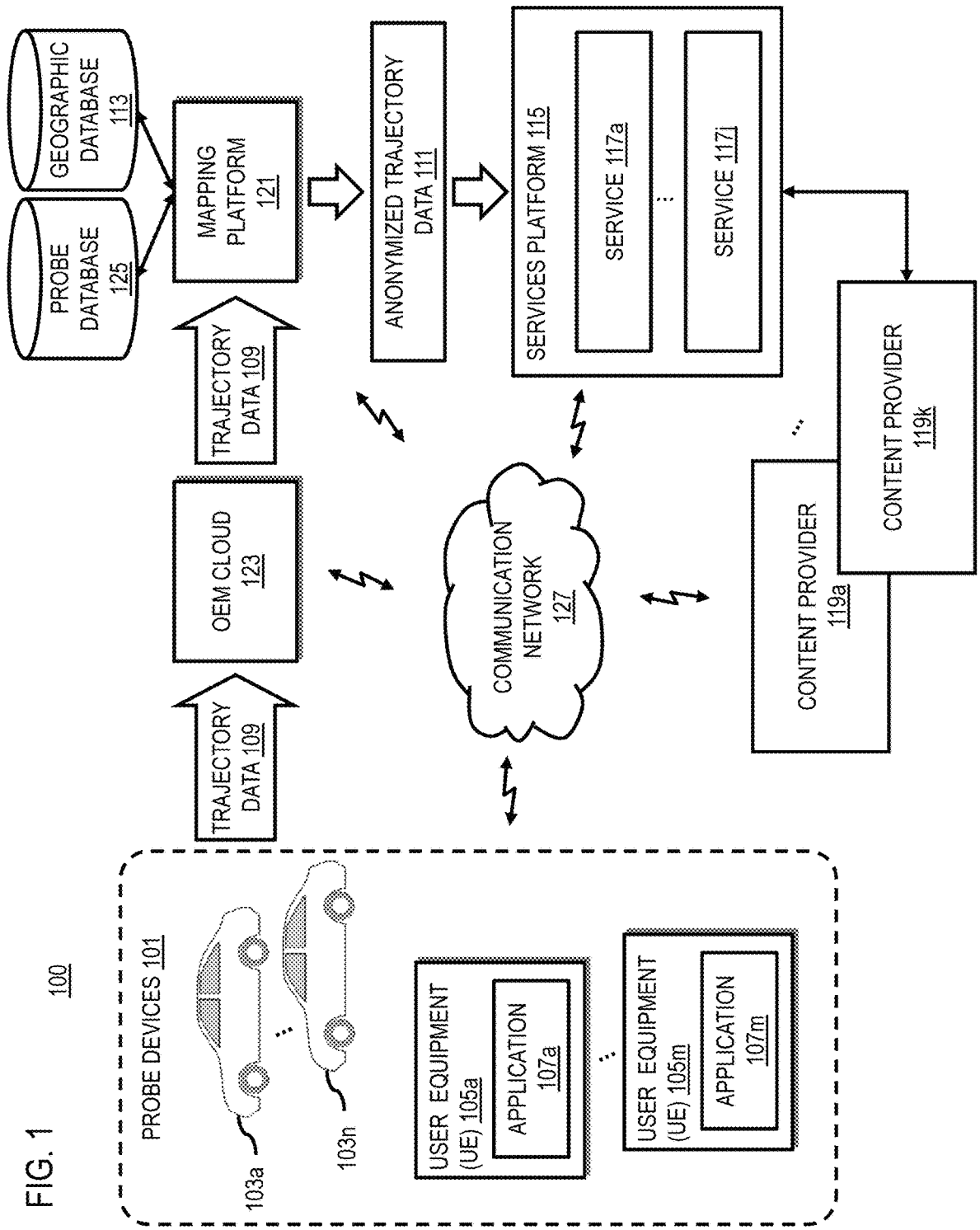
FIG. 1 is a diagram of a system for providing trajectory anonymization based on negative gapping, according to one embodiment.

FIG. 1 is a diagram of a system for providing trajectory anonymization based on negative gapping, according to one embodiment. As discussed above, many location-based service providers and companies collect location data to be used in their services and applications. In one embodiment, location data can be collected as a trajectory representing a sequence of data entries per individual moving entity (e.g., individual probe devices 101), where each entry (e.g., a probe point) consists of location (latitude, longitude), time stamp, a pseudonym (e.g., to indicate which the entries belong to the same entity), and possibly various additional information about the entity at the time (vehicle sensor data, speed, heading etc.). Examples of probe devices 101 include but are not limited to vehicles 103a-103n (also collectively referred to as vehicles 103), user equipment (UE) devices 105a-105m (also collectively referred to as UEs 105) executing location-based applications 107a-107m (also collectively referred to as applications 107), and/or equivalent devices equipped with location sensors (e.g., Global Navigation Satellite System (GNSS) receivers) capable of generating location data (e.g., trajectory data 109).

In collecting location data (e.g., trajectory data 109), service providers and company operate under various regulatory schemes aimed at protecting user privacy. For example, many privacy regulations (e.g., the European Union's Global Data Protection Regulation (GDPR), Article 4(1)) specifically define location data/information as a personal data subject to privacy protection. One of the lawful ways of processing such personal data is anonymization where the data is transformed so that the once personal data cannot be attributed to an identifiable natural person with reasonable likelihood (e.g., according to GDPR, Article 4(26)).

In other words, the technical challenges facing location-based service providers and companies is as follows: given a dataset containing mobility traces (e.g., also referred to as trajectories or probe trajectories comprising the trajectory data 109) of multiple individuals (e.g., associated with individual probe devices 101), service providers and companies would like to transform this trajectory data 109 into anonymized trajectory data 111 that preserves most of the potentially useful information of the initial trajectory data 109 while not containing any private information about the individuals whose mobility traces it contains. By way of example, what services providers and companies consider useful in this case include but are not limited to:

1. The exact locations of the probe points;
2. The coverage of the road network (e.g., a road network as represented in the digital map data of a geographic database 113) with probe points (e.g., how the probe points are distributed along the road network); and
3. The connectivity information of the probe points (e.g., which probe points belong to the same trajectory).

As described above and used herein, a trajectory or probe trajectory is a sequence of location data entries, which are called probe points, where each probe point contains a corresponding probe device 101's location measurement such as latitude, longitude, time stamp (and possibly some additional information such as speed, heading, sensor data.), or equivalent.

In one embodiment, although the attribution of each entity (e.g., probe device 101) to a natural person is masked with a pseudonym (e.g., a unique probe identifier or equivalent), publishing the trajectory data 109 in this form generally does not preserve privacy to the standards of applicable regulations, industry standards, or equivalent. Accordingly, location-based service providers and companies face significant challenges to collecting and generating location data that complies with privacy standards while also maintaining the useful properties described above.

By way of example, one approach to anonymizing the trajectory data 109 can be referred to as split-and-gap. Under this split-and-gap approach, the idea is to:

Split each trajectory in the trajectory data 109 into smaller segments (also referred to as subtrajectories);
Introduce gaps between those segments or subtrajectories (e.g., by deleting points at the ends and beginnings of those segments), therewith introducing "blind spots" where no information of the trajectory is being published; and
Give these segments or subtrajectories new distinct pseudonyms (e.g., new distinct probe identifiers).

The technical challenge with this approach is to select the anonymization parameters for this procedure—that is the lengths of the segments and the lengths of the gaps between them—in such a way that an adversary:

1. Cannot find any useful information about the owner of the trajectory segment from the segment or subtrajectory alone; and
2. Cannot connect these segments or subtrajectories together to obtain (reconstruct) the original trajectory. The attempt to connect the trajectory segments back together we call a reconstruction attack.

Such an anonymization method falls into "anonymization by suppression" domain because data in the trajectory data 109 is suppressed by removing elements and features of the data set. Namely, in one embodiment, this anonymization approach removes datapoints (e.g., probe points), and suppresses a certain amount of connectivity information (e.g., by giving different pseudonyms to trajectory segments originally belonging to the same mobility trace).

So, the technical challenge more specifically relates to removing just enough information (e.g., data points and connectivity—the ability to attribute data points to a unique pseudonym) to segment or fragment trajectories in such a way that:

1. The system 100 provides enough privacy (e.g., enough to meet regulatory and/or industry standards); and
2. The data set (e.g., the resulting anonymized trajectory data 111) contains enough data points and connectivity information to be useful for whatever services and applications (e.g., the services platform 115, the services 117a-117j contained therein, and/or the content providers 119a-119k) that intend to use the anonymized trajectory data 111) as an input.

So, the technical challenge involves facing a privacy/utility tradeoff. For example, the shorter the subtrajectories and the further apart from each other, the better privacy can be preserved (e.g., short subtrajectories provide less information; and large gaps make it harder to connect pieces of trajectories together). On the other hand, the more points/connectivity that is kept in the anonymized trajectory data 111, the richer the data will be for providing services and applications.

To address these technical challenges, the system 100 of FIG. 1 introduces a capability to apply a twist on the split-and-gap method that helps the system 100 get the edge on the utility/privacy tradeoff. More specifically, the system 100 introduces a concept of applying negative gaps when performing trajectory segmentation into subtrajectories to anonymize the data. In contrast to the gap described above where subtrajectories do not overlap in space or time, a negative gap segments a trajectory such that a designated portion (e.g., the end) of one subtrajectory will overlap in space or time with a portion (e.g., the beginning) of at least one next subtrajectory. In one embodiment, the system 100 first decomposes a trajectory (e.g., contained in the trajectory data collected from the vehicles 103, UEs 105, and/or another probe device 101) into a series of parallel tracks (e.g., by subsampling the original trajectory with different distance and/or time offsets), and then split-and-gap each one of those parallel tracks individually but in coordination with each other. In one embodiment, by carefully selecting anonymization parameters reconstruction attacks can be made severely more difficult than it is in the case of traditional split-and-gap. This example embodiment along with other example embodiments of the applying a negative gap for trajectory segmentation or fragmentation are described further below in more detail.

The various embodiments of trajectory anonymization provide for several technical advantages including but not limited to:

The various embodiments described herein are technically easy to implement both offline (e.g., via a server-side trajectory anonymization) and on-the-fly in-vehicle (e.g., via a local client-side trajectory anonymization on the probe device 101).

The various embodiments provide for higher data utility: e.g., with subtrajectories overlapping (i.e., negative gapping), the system 100 gets better road coverage both in terms of probe points and connectivity between them.

With a good or optimized anonymization parameter set (e.g., negative gap size, trajectory length, sampling rate, parallel offset, etc.) makes the anonymized trajectory data 111 significantly more resistant to reconstruction attacks (e.g., forward-in-time search).

Figure 2:
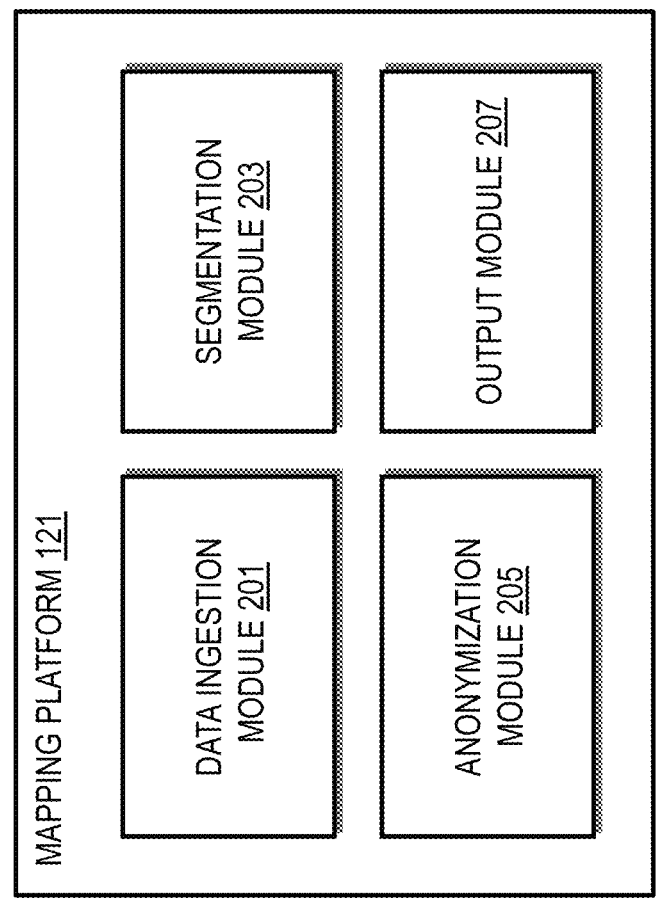
FIG. 2 is a diagram of the components of a mapping platform capable of trajectory anonymization based on negative gapping, according to one embodiment.

In one embodiment, as shown in FIG. 2, a mapping platform 121 of the system 100 includes one or more components for trajectory anonymization using negative gapping according to the various embodiments described herein.

It is contemplated that the functions of the components of the mapping platform 121 may be combined or performed by other components of equivalent functionality. As shown, in one embodiment, the mapping platform 121 includes a data ingestion module 201, a segmentation module 203, an anonymization module 205, and an output module 207. The above presented modules and components of the mapping platform 121 can be implemented in hardware, firmware, software, or a combination thereof. Though depicted as a separate entity in FIG. 1, it is contemplated that the mapping platform 121 may be implemented as a module of any of the components of the system 100 (e.g., a component of an Original Equipment Manufacturer (OEM) cloud 123, services platform 115, any of the services 117a-117j (also collectively referred to as services 117), content providers 119a-119k (also collectively referred to as content providers 119), probe devices 101 (e.g., including vehicles 103 and/or UEs 105), and/or the like. In another embodiment, one or more of the modules 201-207 may be implemented as a cloud-based service, local service, native application, or combination thereof. The functions of the mapping platform 121 and modules 201-207 are discussed with respect to FIGS. 3-5 below.

Figure 3:
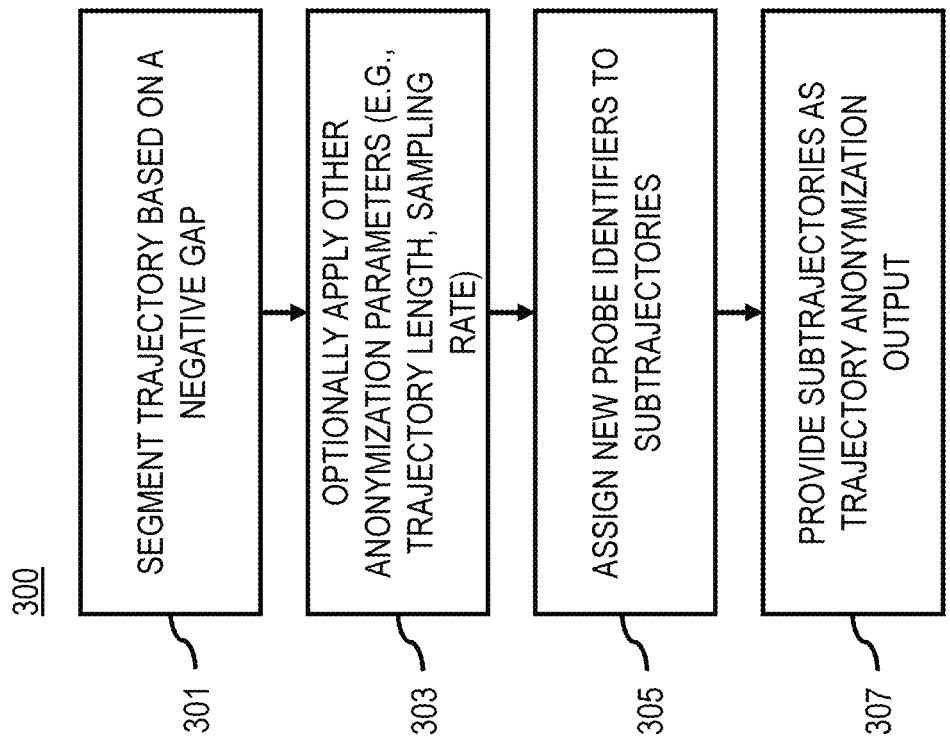
FIG. 3 is a flowchart of a process for providing trajectory anonymization based on negative gapping, according to one embodiment.
Figure 8:
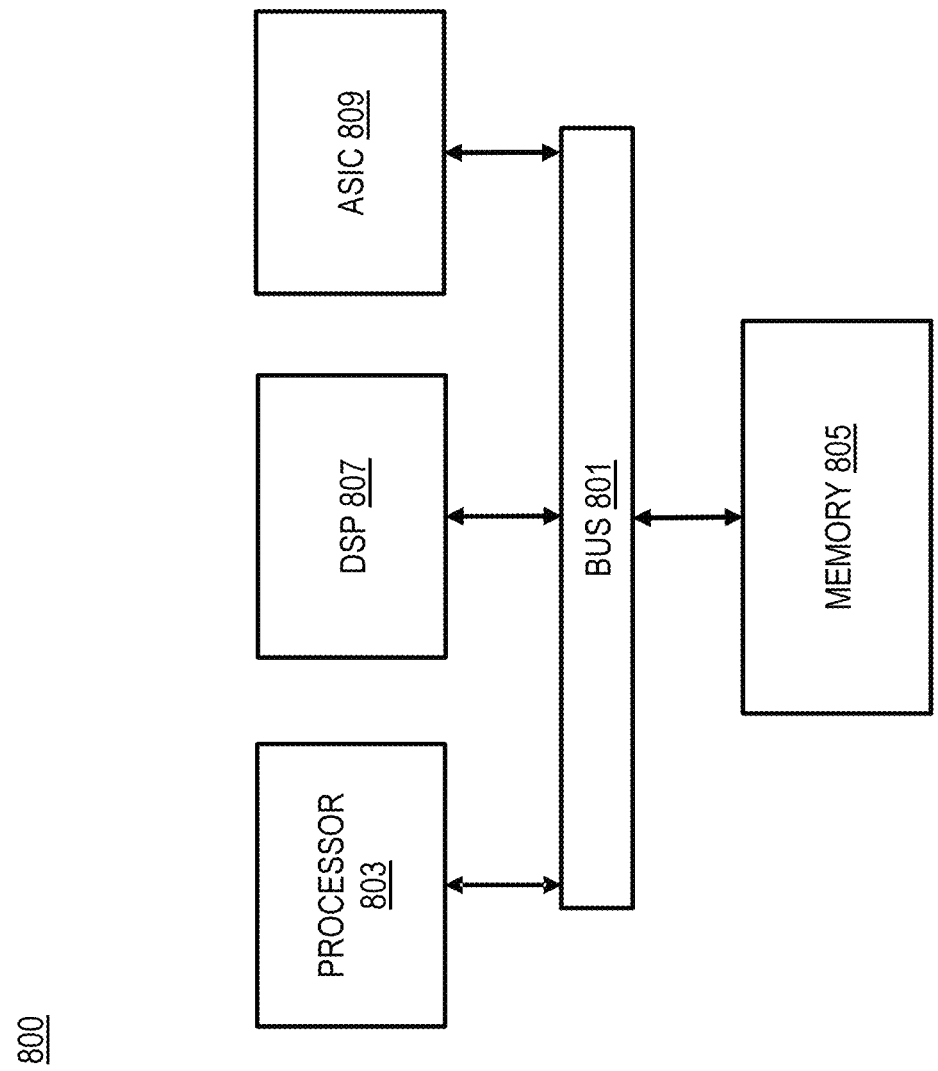
FIG. 8 is a diagram of a chip set that can be used to implement an embodiment.

FIG. 3 is a flowchart of a process for providing trajectory anonymization based on negative gapping, according to one embodiment. In various embodiments, the mapping platform 121 and/or any of the modules 201-207 may perform one or more portions of the process 500 and may be implemented in, for instance, a chip set including a processor and a memory as shown in FIG. 8. As such, the mapping platform 121 and/or any of the modules 201-207 can provide means for accomplishing various parts of the process 500, as well as means for accomplishing embodiments of other processes described herein in conjunction with other components of the system 100. Although the process 500 is illustrated and described as a sequence of steps, it is contemplated that various embodiments of the process 500 may be performed in any order or combination and need not include all of the illustrated steps.

In one embodiment, the process 300 is based on the mapping platform having received or otherwise having access to trajectory data 109 that is to be anonymized using negative gaps according to the embodiments described herein. For example, the data ingestion module 201 of the mapping platform 121 can receive trajectory data 109 directly from the probe devices 101 (e.g., collected from one or more sensors of the probe devices 101 such as GNSS receivers or equivalent location sensors) or via an Original Equipment Manufacturer (OEM) cloud 123 for storage in a probe database 125 for processing and anonymization. By way of example, the OEM cloud 123 can be operated by an automobile manufacturer or device manufacturer to collect trajectory data 109 from its corresponding models of vehicles 103 and/or devices 105 for transmission to the mapping platform 121. By way of example, transmissions between the probe devices 101, mapping platform 121, and/or OEM cloud 123 can over a communication network 127 or equivalent (e.g., a separate logical channel that ultimately flows data over the Internet or other data network). In one embodiment, the trajectory data 109 can include mobility traces or trajectories that have not been anonymized so that the traces can be attributed to a natural person. For example, the trajectory data 109 are non-anonymized in that the data may include trajectories with pseudonyms or probe identifiers that can be associated with a natural person or include attributes or meta-data from which the association to a natural person can be derived.

In step 301, after receiving the trajectory data 109, the segmentation module 203 can interact with the anonymization module 205 to process a probe trajectory (or multiple probe trajectories) of the trajectory data 109 to segment the probe trajectory(ies) into a first subtrajectory and a second subtrajectory based on a negative gap between the first subtrajectory and the second subtrajectory. In one embodiment, the negative gap specifies an amount of overlap between the end of the first trajectory and the beginning of the second subtrajectory.

In other words, the mapping platform 121 uses negative gapping to advantageously improve the balance between preserving location data privacy while maintaining the utility of the resulting anonymized trajectory data 111. For example, the segmentation module 203 and anonymization module 205 can employ embodiments of the process 300 to improve the traditional approaches to split-and gap anonymization by performing at least one of the following:

1. Optionally select the anonymization parameters (e.g., subtrajectory length, negative gap length, sampling rate, etc.) for segmenting trajectories at random (e.g., spatially and/or temporally) (step 303 of the process 300); and
2. Introduce negative gaps.

In one embodiment, for randomization of anonymization parameters (item 1 above representing step 303 of the process 300), instead of splitting and gapping at a fixed time interval, the segmentation module 203 and/or anonymization module 205 selects values for each anonymization parameter (e.g., each negative gap and each subtrajectory length) at random within a given range. In other words, the mapping platform 121 can determine a random gap length for the amount of overlap of the negative gap between two subtrajectories. In addition or alternatively, the mapping platform 121 can determine a trajectory/subtrajectory length for segmenting the probe trajectory into multiple subtrajectories, and this trajectory length can be a random trajectory length. In one embodiment, the random gap length and random trajectory length can be determined from a specified range or values (e.g., a range specifying minimum and maximum values between which random values are chosen). This random selection from a range is also applicable to any other anonymization parameter (e.g., sampling rate for generative subtrajectories) used by the mapping platform 121 to anonymize the trajectory data 109. In one embodiment, the anonymization module 205 can chose new random anonymization parameter values for each given subtrajectory or set of subtrajectories. Furthermore, the anonymization module 205 could also select randomly which parameter—e.g., temporal (time) or spatial (distance)—defines the length of the negative gap and/or subtrajectory. This adds, for instance, additional uncertainty and can make a reconstruction attack more difficult, thereby advantageously increasing privacy protection.

In one embodiment, the segmentation module 203 applies negative gaps. Negative gaps, for instance, enable anonymized subtrajectories belonging to the same original trajectory to overlap (e.g., in time and/or distance). This would make traditional reconstruction attacks based on tracking approaches (e.g., reconstruct trajectories by looking forward in time) less successful, thereby advantageously increasing privacy protection. In one embodiment, the segmentation module 203 and anonymization module 205 of the mapping platform 121 can anonymize the trajectory data 109 using negative gapping in at least the two described below. It is contemplated that the two approaches to negative gapping described in the various embodiments below are provided by way of illustration and not as limitations. It is contemplated that any equivalent approach or combination of approaches for negative gapping can be performed according to the embodiments described herein.

Figure 4A:
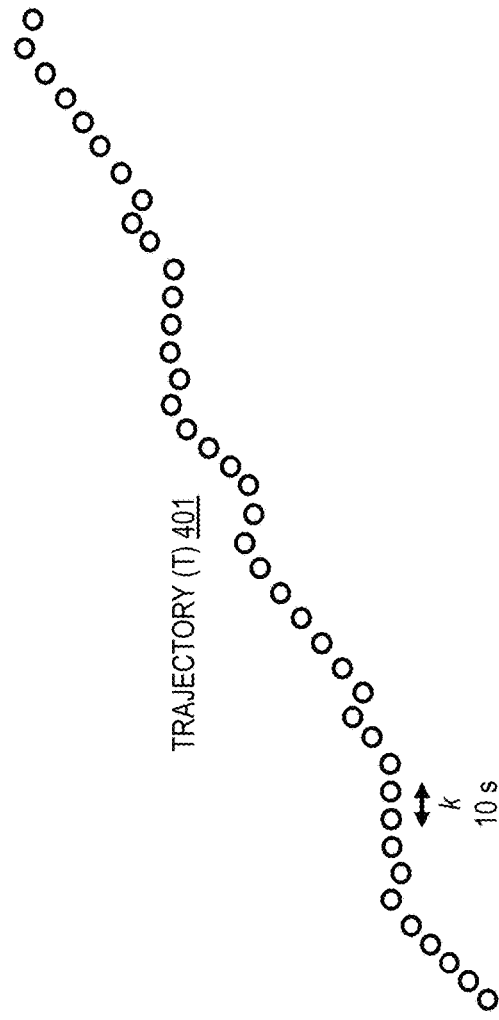
FIGS. 4A-4G are diagrams illustrating an example approach to trajectory anonymization based on negative gapping, according to one embodiment.

FIGS. 4A-4F are diagrams illustrating a first example approach to trajectory anonymization based on negative gapping, according to one embodiment. FIG. 4A illustrates an original raw trajectory T 401 sampled with at a designated sampling rate k (e.g., 10 s). The sampling rate k, for instance, indicates the frequency at which a probe device 101 (e.g., vehicle 103 and/or UE 105) captures (e.g., via one or more location sensors such as a GNSS receiver or equivalent) location data points (e.g., probe points) as the probe device 101 travels, for instance, in a road network. In other words, the probe device 101 is configured to create a trajectory comprising a time-stamped sequence of the probe points in which each probe point is captured according to the designated sampling rate k. As previously discussed, each probe point can be represented based on a timestamp (e.g., at which the probe point was captured), sensed geographic coordinates (e.g., latitude, longitude, altitude) in addition to other optional parameters (e.g., speed, heading, other sensor data, etc.). As shown in FIG. 4A, the trajectory 401 comprises a sequence of probe points represented as a sequence of circles at each time interval corresponding to at a sampling rate of k=10 s.

In one embodiment, the mapping platform 121 can begin the processing of the trajectory 401 by selecting anonymization parameters. Examples of anonymization parameters include but are not limited to:

Trajectory or subtrajectory length (tr_size)—this parameter determines the length that a subtrajectory segmented from an original trajectory will be. This parameter can be specified based on time (e.g., seconds traversed by a trajectory) and/or length (e.g., distance traversed by a trajectory). In one embodiment, the trajectory length parameter can be randomly chosen within a given range. As shown in the example of FIGS. 4A-4G, the trajectory length 413 for processing trajectory 401 is chosen as tr_size=300 s.

Sample rate (m)—this parameter determines the frequency at which the original trajectory 401 will be subsampled to generate a subtrajectory. In the example of FIGS. 4A-4G, the sampling rate m is designated at 30 s. This means that the original trajectory 401 that was captured at a sampling rate k=10 s will be converted to at least one subtrajectory with a sampling rate m=30 s by, for instance, data suppression.

Negative gap size (gapSize)—this parameter determines the extent to which the subtrajectories segmented from the original trajectory 401 will overlap (e.g., in time or distance). In one embodiment, the parameter can be randomly chosen within a given range (e.g., [−100 s, +100 s]). In some embodiments, this range practically translates into [−100 s, −50 s] and [+50 s, +100 s] to avoid close to zero gaps (e.g., occurring between [−50 s, +50 s]). In the example of FIGS. 4A-4G, gapSize is set to −50 s for trajectory 401.

After selecting the anonymization parameters according to the embodiments above, the mapping platform 121 can perform the steps described below to anonymize the trajectory 401 according to embodiments of the first approach to negative gapping.

Figure 4B:
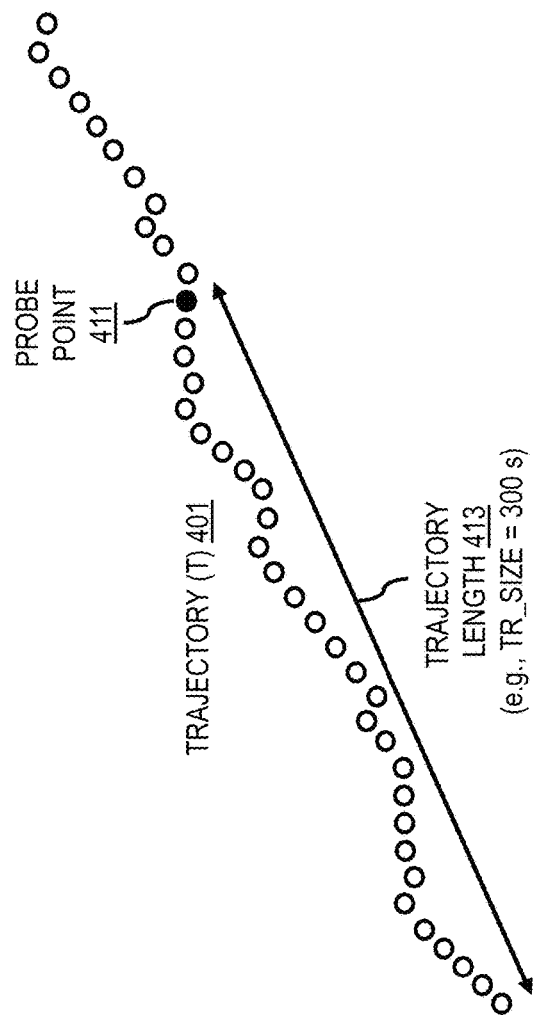

In the step illustrated in FIG. 4B, the mapping platform 121 first determines the last probe point (e.g., indicated by probe point 411) in the trajectory 401 that makes it tr_size long. In other words, the mapping platform 121 can begin from the first probe point of the trajectory 401 to identify the probe point 411 that is a trajectory length 413 of tr_size=300 s away from that first probe point.

Figure 4C:
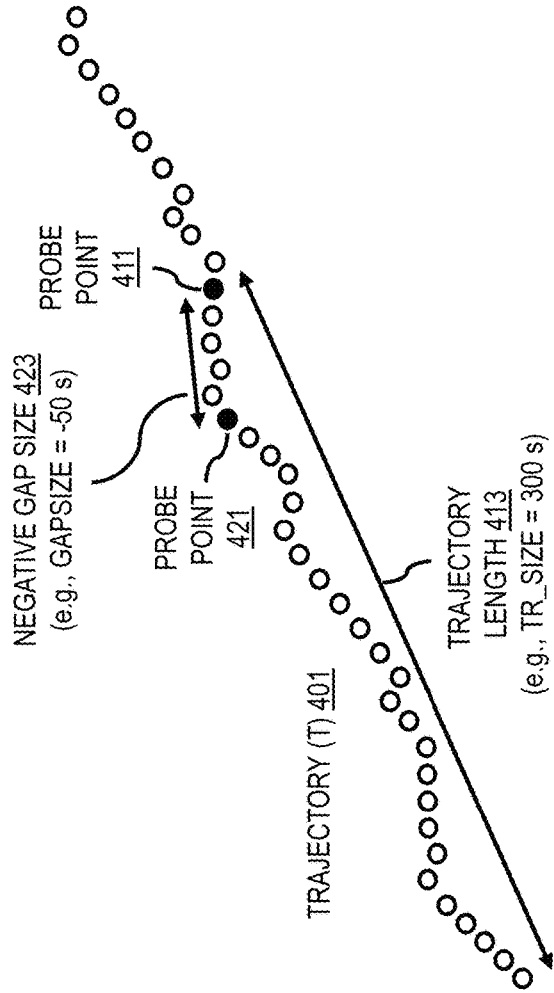

In the step illustrated in FIG. 4C, the mapping platform 121 then determines a probe point (e.g., probe point 421) that is a negative gap size 423 (e.g., set at gapSize=−50 s) from the previously determined probe point 411 that is at the trajectory length 413 (e.g., tr_size=300 s) from the beginning of the trajectory 401. Probe point 421 will the first probe point of the next subtrajectory with a new pseudonym (e.g., new probe identifier). As shown, the negative gap size 423 with a value of −50 s means that the new subtrajectory beginning with probe point 421 will overlap by 50 s with the subtrajectory starting from the beginning of the trajectory 401 and ending at probe point 411.

Figure 4D:
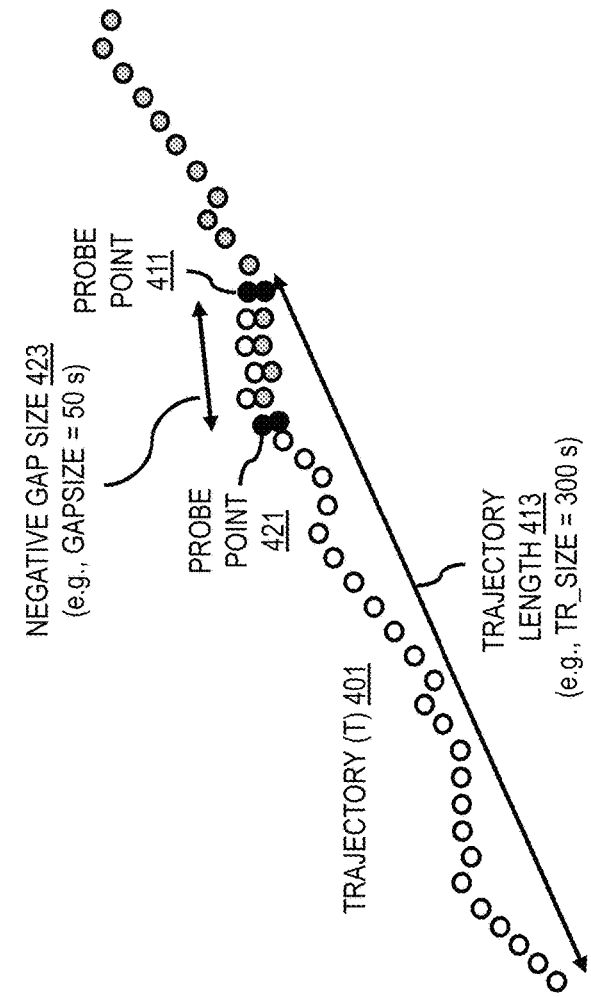

In the step illustrated in FIG. 4D, the mapping platform 121 creates a new subtrajectory from the new starting probe point 421 calculated in the step of FIG. 4C and assigns it to a new pseudonym (e.g., new probe identifier). As shown, the new second subtrajectory is indicated by shaded circles to distinguish them from the unshaded circles of the first subtrajectory. The overlapping probe points of the first and second subtrajectories are represented as doubled circles to highlight the negative gap size 423.

Figure 4E:
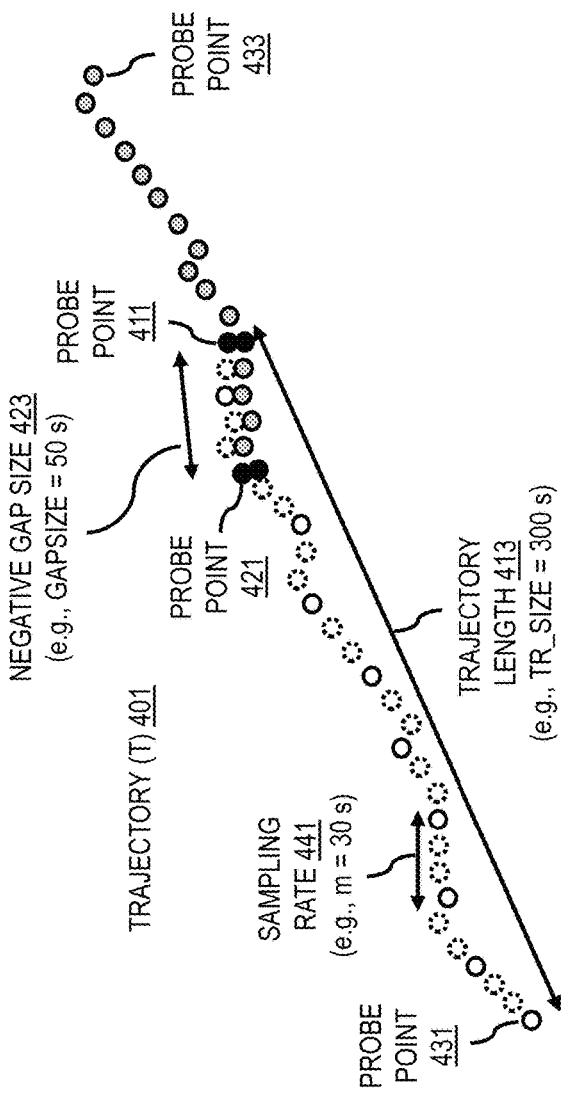

In the step illustrated in FIG. 4E, the mapping platform 121 can subsample the first subtrajectory (e.g., from probe point 431 to probe point 411) with the sampling rate m 441 (e.g., 30 s). As shown, the subsampling of the first subtrajectory will result in erasing or dropping the probe points indicated by respective dashed circles. These dashed circles represent the original points of the first subtrajectory that are not selected based on subsampling using the sampling rate of m=30 s.

Figure 4F:
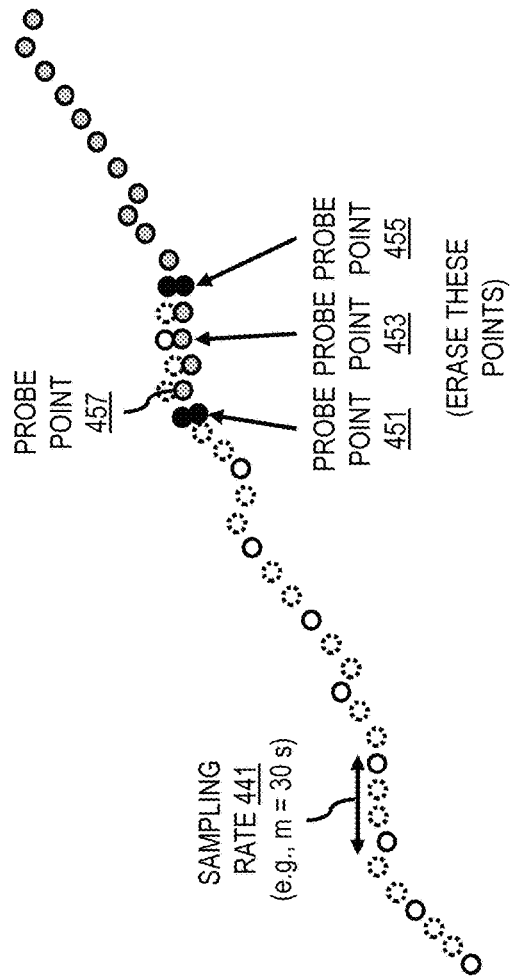

In the step illustrated in FIG. 4F, the mapping platform 121 can erase all probe points of the second subtrajectory (e.g., from probe point 451 to the end of the trajectory 401) that remained in the first subtrajectory after the step of FIG. 4E (e.g., probe points 451, 453, and 455). Because probe point 451 was the original beginning of the second subtrajectory and has been erased, the new first point of the second probe trajectory is now probe point 457.

Figure 4G:
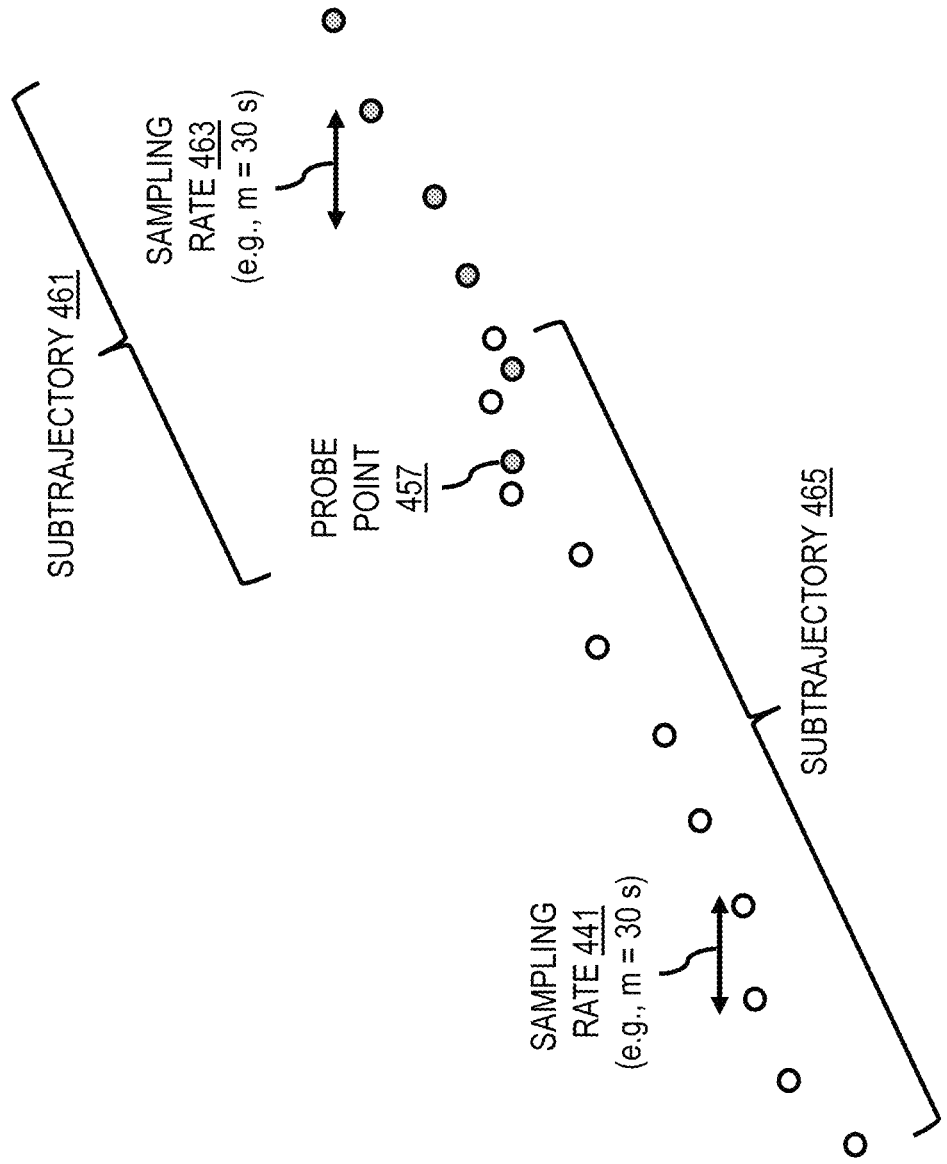

In the step illustrated in FIG. 4G, the mapping platform 121 can subsample the second subtrajectory 461 from the new starting probe point 457 at a sampling rate m 463 (e.g., 30 s). It is noted that although the sampling rate m 441 used to subsample the first subtrajectory 465 is shown as being the same as the sampling rate m 463 used to subsample the second subtrajectory 461, it is contemplated that in some embodiments, different sample rate values can be chosen and used for each different subtrajectory. After this subsampling, the resulting first subtrajectory 465 and second subtrajectory 461 can be assigned different respective new pseudonyms to complete trajectory anonymization according to a first embodiment or approach to negative gapping.

In addition or alternatively, in one embodiment, a temporal offset can be applied to either or both of the first subtrajectory 465 or subtrajectory 461 to prevent an attacker from inferring that the two subtrajectories 465 and 461 are related. For example, if a probe device 101 (e.g., vehicle 103) that generated the raw trajectory data 109 is traveling at constant speed, interpolation might reveal that missing probe points of one subtrajectory overlap with those of the other subtrajectory. By using a temporal offset to shift the timestamps of, for instance, one or more of the subtrajectories (e.g., by 1-30 seconds) the data will still be useful for various applications (e.g., traffic models and the like), but it would introduce artificial movement artifacts (e.g., acceleration/braking) making it even more difficult to relate one subtrajectory (e.g., the first subtrajectory 465) with other subtrajectory (e.g., the second subtrajectory 461) generated from the same original trajectory. By way of example, the temporal offset may be random. The temporal offset can also be constant (e.g., by 1-2 seconds), creating the appearance of vehicles following each other. The above examples of temporal offsets are provided by way of illustration and not as limitations. It is contemplated that temporal offset can be determined using any means including but not limited to any heuristic, function, and/or the like.

In summary, embodiments of the first approach to negative gapping is as follows. For the given trajectory T 401, the mapping platform 121 randomly choses anonymization parameters within a given range for parameters such as but not limited to: trajectory/subtrajectory length=tr_size, sampling rate=m, and negative gap size=gapSize which is negative number. The mapping platform 121 then proceeds with trajectory anonymization as follows:

1. Find the splitting point of the trajectory T 401 based on tr_size parameter and mark it as the last point of the first subtrajectory in the resulting anonymized trajectory.
2. Find a point or closest point that is gapSize apart from the previously determined last point of the first subtrajectory. This will be the first point of the next subtrajectory with the new pseudonym or probe identifier.
3. Create a new subtrajectory starting from the new starting point calculated in the step 2 and assign it to a new pseudonym or probe identifier.
4. Subsample the first subtrajectory with the sampling rate m.
5. Erase all points in the second subtrajectory that overlap with the remaining points of the first subtrajectory after the subsampling in step 4, and update the new starting point if needed (e.g., when a point has been deleted because it overlapped such as the points 451 and 457 of FIG. 4F.
6. Subsample the second subtrajectory from the new starting point with the sampling rate m.

FIG. 5 is a diagram illustrating a second example approach to trajectory anonymization based on negative gapping using parallel tracks, according to one embodiment. In one embodiment of this second approach, the mapping platform 121 first decomposes each trajectory of the trajectory data 109 into a set of parallel point-disjoint subtrajectories each spanning the whole lifetime-interval of the original trajectory. The mapping platform 121, for instance, can create the parallel tracks by subsampling the original trajectory with different offsets (e.g., offsets from the beginning of the original trajectory) and then cutting out subtrajectories from these parallel tracks.

In one embodiment, the parallel track approach can be based on at least one of the following:

1. The assumption that the input set has reasonably high probe frequency (the points along the same trajectory are close in time), which means that subsampling it (reducing probe frequency) does not have a dramatic effect on the data utility; and
2. Selection of the anonymization parameters (e.g., gap and subtrajectory sizes).

The example of FIG. 5 assumes that the dataset (e.g., the trajectory data 109) has the same initial data frequency of k>0 seconds, meaning that in most cases any two neighboring points along the same trajectory in the input dataset are k seconds apart.

In addition, let m, m>k, m=d×k, (where m, d, k are positive integers) be the data frequency of the anonymized dataset (e.g., the anonymized trajectory data 111). By way of example, in the anonymized dataset, the neighboring probe or data points in every subtrajectory are m seconds apart (modulo some outlier points missing from the original dataset).

Then, let T be a trajectory of n+1 points with indices $\{t_0, t_0+k, \ldots t_0+n*k\}$. In one embodiment, the indices can be defined arbitrarily, e.g., they can represent the order in which the probe points are generated, or the timestamp in which probe points are generated.

In one embodiment, the mapping platform can then perform one or more steps of the following algorithm or process:

1. The mapping platform 121 first splits a trajectory T into d number of parallel tracks where d=m/k parallel tracks with offsets $\{0, k, 2k, \ldots, (d-1)*k\}$ as follows:

$$T_0=(t_0, t_0+m, t_0+2*m, \ldots t_0+[n*k/m]*m),$$

$$T_1=(t_0+k, t_0+k+m, t_0+k+2*m \ldots t_0+n_0),$$

where $n_0=[n*k/m]*m+k$, if $[n*k/m]*m+k<n*k$, and $n_0=([n*k/m]-1)*m+k$ otherwise and so on according to the formula:

$$T_i=(t_0+i*k, t_0+m+i*k, \ldots +n_i),$$

where $n_i=[n*k/m]*m+i*k$, if $[n*k/m]*m+i*k<n*k$, and $n_0=([n*k/m]-1)*m+i*k$ otherwise, for all $0 \le i \le d-1$.

Note that the mapping platform 121 does not necessarily need to create those parallel trajectories. Instead, the mapping platform 121 can just access the probe points based on indices/offsets. FIG. 5 illustrates examples of the parallel tracks for two different value sets of k and m. For example, a first set 501 is a set of parallel tracks based on k=1, m=3, and d=3; and a second set 503 is a set of parallel tracks based on k=2, m=12, and d=6. As shown, the original trajectory of each set 501 and 503 is shown as a linear sequence of dark shaded circles, each representing a probe point in the trajectory. Each subtrajectory is shown below the respective original trajectories with dark shaded circles indicating the probe points from the original trajectory that is kept and the light shaded circles indicating the probe points from the original trajectory that are erased from each subtrajectory. In this way, duplication of probe points across the different parallel tracks is avoided.

2. Optionally (e.g., for computational optimization to reduce use of computational resources), the mapping platform 121 can preselect the subset of these tracks to be used in the resulting anonymized dataset (e.g., the anonymized trajectory data 111).
3. The mapping platform can then anonymize the trajectory data 109 using negative gapping as follows:
   a. For every track $T_j$, the mapping platform 121 stores the first probe point not yet used in the anonymized dataset. In one embodiment, it can be done in the array indexed by the offset: Tails[offset], $0 \le$offset$\le d-1$.
   b. The mapping platform 121 selects an initial track $T_j$ at random and generate the subtrajectory length length (e.g., a random length selected from a designated range).
   c. The mapping platform 121 creates the subtrajectory by taking the probe points with index {Tails[j], Tails[j]+m, ... min(Tails[j]+[length/m]*m, $t_0+n_j$)} where $n_j$ is the last index of $T_j$ defined above.

d. The mapping platform 121 updates Tails[j].
e. The mapping platform 121 stores the index of the end of the created subtrajectory as lastUsedIndex.
f. The mapping platform 121 generates the negative gap size value gapSize (e.g., selected at random within a designated range), and generates trajectory length length>0 (e.g., selected at random within a designated range).
g. The mapping platform 121 selects the track where Tails[j]<t, where t=lastUsedIndex+gapSize. In one embodiment, this track can be selected at random or by using an optimization criterion such as but not limited to the one with the earliest available index.
h. The mapping platform 121 creates the subtrajectory by taking the probe points with indices indicated as follows:

$$\{t', t'+m, \ldots \min(\text{Tails}[j]+[\text{length}/m]*m, n_j)\},$$

Where t' is the minimum index in $T_j$ such that t'≥t.
This means that the mapping platform 121 takes the earliest available index that is the exact index of the end of the previously created subtrajectory plus the gap size. If the exact value does not exist with this offset, the next possible option is taken. Note that in the case of a negative gap, it will be earlier than the end of the previously handled trajectory, while in the case of a positive gap, it will be later than that end of the previously handled trajectory.
i. The mapping platform 121 can repeat steps d-h until there are no more unused points or until any other equivalent stopping criterion is met.
4. Steps 1-3 can be repeated for all input trajectories that are to be processed.

It is noted that although the embodiments of the two approaches to trajectory anonymization described above are discussed with respect to applying negative gaps between segmented subtrajectories. It is contemplated that the embodiments are also applicable to positive gap values (e.g., where the subtrajectories are separated by a gap). In one embodiment, the mapping platform 121 can use both negative and positive gaps between segmented trajectories to make it more difficult for a reconstruction attack to be perform and ensured an increased level of privacy protection.

In one embodiment, when generating or determining anonymization parameter values (e.g., the gap size, the subtrajectory length values, etc.), the mapping platform 121 can make sure that the resulting set of subtrajectories originating from the same input trajectory does not contain a subset that is easily reconstructable into a decent approximation of the original track. For example, one way (but not an exclusive way) to ensure this is to only generate negative gaps that are significantly smaller than trajectory sizes (e.g., smaller than a designated threshold percentage of the trajectory sizes), so that skipping one subtrajectory would make it difficult to connect the remaining ones into one trajectory, further improving privacy protection while providing for increased utility of the resulting anonymized trajectory data 111.

Returning to step 305 of the process 300, after segmenting the original trajectory(ies) of the trajectory data 109 into subtrajectories, the anonymization module 305 of the mapping platform 121 assign new pseudonyms or probe identifiers to each of the newly created subtrajectories. In other words, in the case of segmenting a trajectory into two subtrajectories, the anonymization module 305 can assign a first pseudonym to the first subtrajectory, and a second pseudonym to the second subtrajectory. By way of example, a pseudonym can be any identifier or label (e.g., a probe identifier or equivalent) that can be associated with a trajectory/subtrajectory or the probe points contained therein so that the corresponding probe points can be connected as belonging to the same trajectory or subtrajectory. By assigning different pseudonyms to different subtrajectories, the connection between different subtrajectories segmented from the same original trajectory can be hidden or otherwise obscured. In one embodiment, the resulting subtrajectories with new and distinct pseudonyms comprised the anonymized trajectory data 111.

In step 307 of the process 300, the output module 207 of the mapping platform 121 can providing the anonymized subtrajectories (e.g., the anonymized trajectory data 111 including, for instance, the first subtrajectory and the second subtrajectory discussed above) as a trajectory anonymization output. By way of example, the anonymization output can be provided (e.g., transmitted/received over a communication network 127) to/from any authorized service or application requesting the data. As previously noted, these services and applications can include but are not limited to the services 117 of the services platform 115 or equivalent.

Returning to FIG. 1, in one embodiment, the mapping platform 121 of system 100 has access to the probe database 125 for storing the trajectory data 109 (original or raw trajectories) and/or the resulting anonymized trajectory data 111 (e.g., anonymized using negative gapping according to the embodiments described herein). In one embodiment, the mapping platform 121 also has connectivity to a geographic database 113 to provide location-based services based on the trajectory data 109 and/or anonymized trajectory data 111. The mapping platform 121 can operate, for instance, in connection with probe devices 101 such as but not limited to one or more vehicles 103 and/or one or more UEs 105 (e.g., mobile devices) that can be carried by a user as a pedestrian or in a car (e.g., vehicle 103). Though depicted as automobiles, it is contemplated the vehicles 103 can be any type of transportation vehicle manned or unmanned (e.g., planes, aerial drone vehicles, motorcycles, boats, bicycles, etc.). Alternatively, the UE 105 may be a personal navigation device ("PND"), a cellular telephone, a mobile phone, a personal digital assistant ("PDA"), a watch, a camera, a computer and/or any other device that supports location-based services, e.g., digital routing and map display. It is contemplated that a device employed by a pedestrian may be interfaced with an on-board navigation system of a vehicle 103 or wirelessly/physically connected to the vehicle 103 to serve as the navigation system. Also, the UE 105 may be configured to access the communication network 127 by way of any known or still developing communication protocols to transmit and/or receive trajectory data 109 and/or anonymized trajectory data 111.

Also, the vehicle 103 and/or UE 105 may be configured with an application 107 for collecting probe data (e.g., trajectories) and/or for interacting with one or more content providers 119, services 117 of a services platform 115, or a combination thereof. The application 107 may be any type of application that is executable on the vehicle 103 and/or UE 105, such as mapping applications, location-based service applications, navigation applications, content provisioning services, camera/imaging applications, media player applications, social networking applications, calendar applications, and the like. In one embodiment, the application 107 may act as a client for the mapping platform 121 and perform one or more functions of the mapping platform 121 alone or in combination with the mapping platform 121. In yet another embodiment, the content providers 119, services 117, and/or services platform 115 receive the anonymized trajectory data 111 generated by the mapping platform 121 for executing its functions and/or services.

The vehicle 105 and/or UE 105 may be configured with various sensors (not shown for illustrative convenience) for acquiring and/or generating probe data associated with a vehicle 103, a driver, other vehicles, conditions regarding the driving environment or roadway, etc. For example, sensors may be used as GNSS/GPS receivers for interacting with one or more navigation satellites to determine and track the current speed, position and location of a vehicle travelling along a roadway. In addition, the sensors may gather other vehicle sensor data such as but not limited to tilt data (e.g., a degree of incline or decline of the vehicle during travel), motion data, light data, sound data, image data, weather data, temporal data and other data associated with the vehicle 103 and/or UEs 105. Still further, the sensors may detect local or transient network and/or wireless signals, such as those transmitted by nearby devices during navigation of a vehicle 103 along a roadway (Li-Fi, near field communication (NFC)) etc. This may include, for example, network routers configured within a premise (e.g., home or business), another UE 105 or vehicle 103 or a communications-capable traffic system (e.g., traffic lights, traffic cameras, traffic signals, digital signage, etc.).

It is noted therefore that the above described data may be transmitted via communication network 127 as probe data (e.g., trajectory data 109) according to any known wireless communication protocols. For example, each UE 105, mobile application 107, user, and/or vehicle 103 may be assigned a unique probe identifier (probe ID) or pseudonym for use in reporting or transmitting said trajectory data 109 collected by the vehicles 103 and UEs 105. In one embodiment, each vehicle 103 and/or UE 105 is configured to report probe data as probe points, which are individual data records collected at a point in time that records location data. Probes or probe points can be collected by the system 100 from the UEs 105, applications 107, and/or vehicles 103 in real-time, in batches, continuously, or at any other frequency requested by the system 100 over, for instance, the communication network 127 for processing by the mapping platform 121.

In one embodiment, the mapping platform 121 retrieves aggregated probe points gathered and/or generated by UE 105 resulting from the travel of UEs 105, and vehicles 103 on a road segment or other travel network (e.g., pedestrian paths, etc.). The probe database 125 stores a plurality of probe points and/or trajectories (e.g., trajectory data 109) generated by different UEs 105, applications 107, vehicles 103, etc. over a period of time. A time sequence of probe points specifies a trajectory—i.e., a path traversed by a UE 105, application 107, vehicles 103, etc. over a period of time.

In one embodiment, the communication network 127 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the mapping platform 121 may be a platform with multiple interconnected components. The mapping platform 121 may include multiple servers, intelligent networking devices, computing devices, components, and corresponding software for minding pedestrian and/or vehicle specific probe data from mix-mode probe data. In addition, it is noted that the mapping platform 121 may be a separate entity of the system 100, a part of the one or more services 117 of the services platform 115, or included within the UE 105 (e.g., as part of the applications 107).

In one embodiment, the content providers 119 may provide content or data (e.g., probe data) to the components of the system 100. The content provided may be any type of content, such as probe data (e.g., trajectory data 109 and/or anonymized trajectory data 111), location data, textual content, audio content, video content, image content, etc. In one embodiment, the content providers 119 may also store content associated with the vehicles 103, the UE 105, the mapping platform 121, and/or the services 117. In another embodiment, the content providers 119 may manage access to a central repository of data, and offer a consistent, standard interface to data, such as a trajectories database, a repository of probe data, average travel times for one or more road links or travel routes (e.g., during free flow periods, day time periods, rush hour periods, nighttime periods, or a combination thereof), speed information for at least one vehicle, other traffic information, etc. Any known or still developing methods, techniques, or processes for retrieving and/or accessing trajectory or probe data from one or more sources may be employed by the mapping platform 121.

By way of example, the UE 105, application 107, vehicles 103, and mapping platform 121 communicate with each other and other components of the system 100 using well known, new or still developing protocols. In this context, a protocol includes a set of rules defining how the network nodes within the communication network 127 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 6:
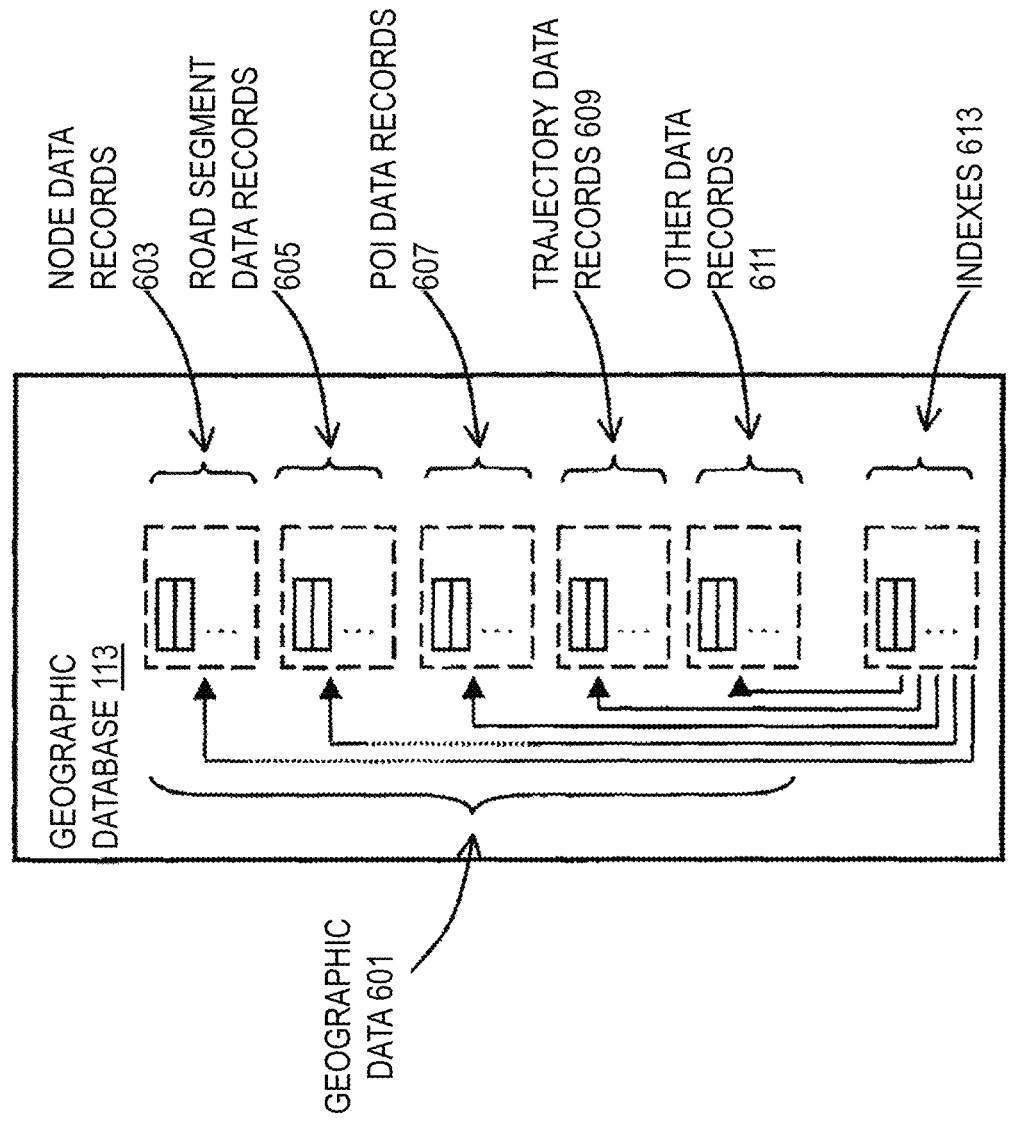
FIG. 6 is a diagram of geographic database, according to one embodiment.

FIG. 6 is a diagram of the geographic database 113 of system 100, according to exemplary embodiments. In the exemplary embodiments, modal routes, trajectories (sequences of probe points), road segments, lane model information and/or other related information can be stored, associated with, and/or linked to the geographic database 113 or data thereof. In one embodiment, the geographic database 113 includes geographic data 601 used for (or configured to be compiled to be used for) mapping and/or navigation-related services, such as for personalized route determination, according to exemplary embodiments. For example, the geographic database 113 includes node data records 603, road segment or link data records 605, POI data records 607, trajectory data records 609, and other data records 611. More, fewer, or different data records can be provided. In one embodiment, the other data records (not shown) can include cartographic ("carto") data records, routing data, and maneuver data. One or more portions, components, areas, layers, features, text, and/or symbols of the POI or event data can be stored in, linked to, and/or associated with one or more of these data records. For example, one or more portions of the trajectories or modal routes can be matched with respective map or geographic records via position or GPS data associations (such as using known or future map matching or geo-coding techniques).

In exemplary embodiments, the road segment data records 605 are links or segments representing roads, streets, or paths, as can be used in the calculated route or recorded route information for determination of one or more personalized routes, according to exemplary embodiments. The node data records 603 are end points corresponding to the respective links or segments of the road segment data records 605. The road link data records 605 and the node data records 603 represent a road network, such as used by vehicles, cars, and/or other entities. Alternatively, the geographic database 113 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 113 can include data about the POIs and their respective locations in the POI data records 607. The geographic database 113 can also include data about places, such as cities, towns, or other communities, and other geographic features, such as bodies of water, mountain ranges, etc. Such place or feature data can be part of the POI data records 607 or can be associated with POIs or POI data records 607 (such as a data point used for displaying or representing a position of a city).

In addition, the geographic database 113 can include trajectory data records 609 for storing trajectory data 109, anonymized trajectory data 111, and/or any other related data used in the embodiments of trajectory anonymization using negative gaps described herein.

The geographic database 113 can be maintained by the content provider 119 in association with the services platform 115 (e.g., a map developer). The map developer can collect geographic data to generate and enhance the geographic database 113. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 113 can be a master geographic database stored in a format that facilitates updating, maintenance, and development. For example, the master geographic database 113 or data in the master geographic database 113 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 105. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 113 can be a master geographic database, but in alternate embodiments, the geographic database 113 can represent a compiled navigation database that can be used in or with end user devices (e.g., vehicle 103, UE 105, etc.) to provide navigation-related functions (e.g., functions based on anonymized trajectory data 111). For example, the geographic database 113 can be used with the end user device to provide an end user with navigation features. In such a case, the geographic database 113 can be downloaded or stored on the end user device (e.g., vehicle 103, UE 105, etc.), such as in application 107, or the end user device can access the geographic database 113 through a wireless or wired connection (such as via a server and/or the communication network 127), for example.

The processes described herein for providing trajectory anonymization using negative gaps may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
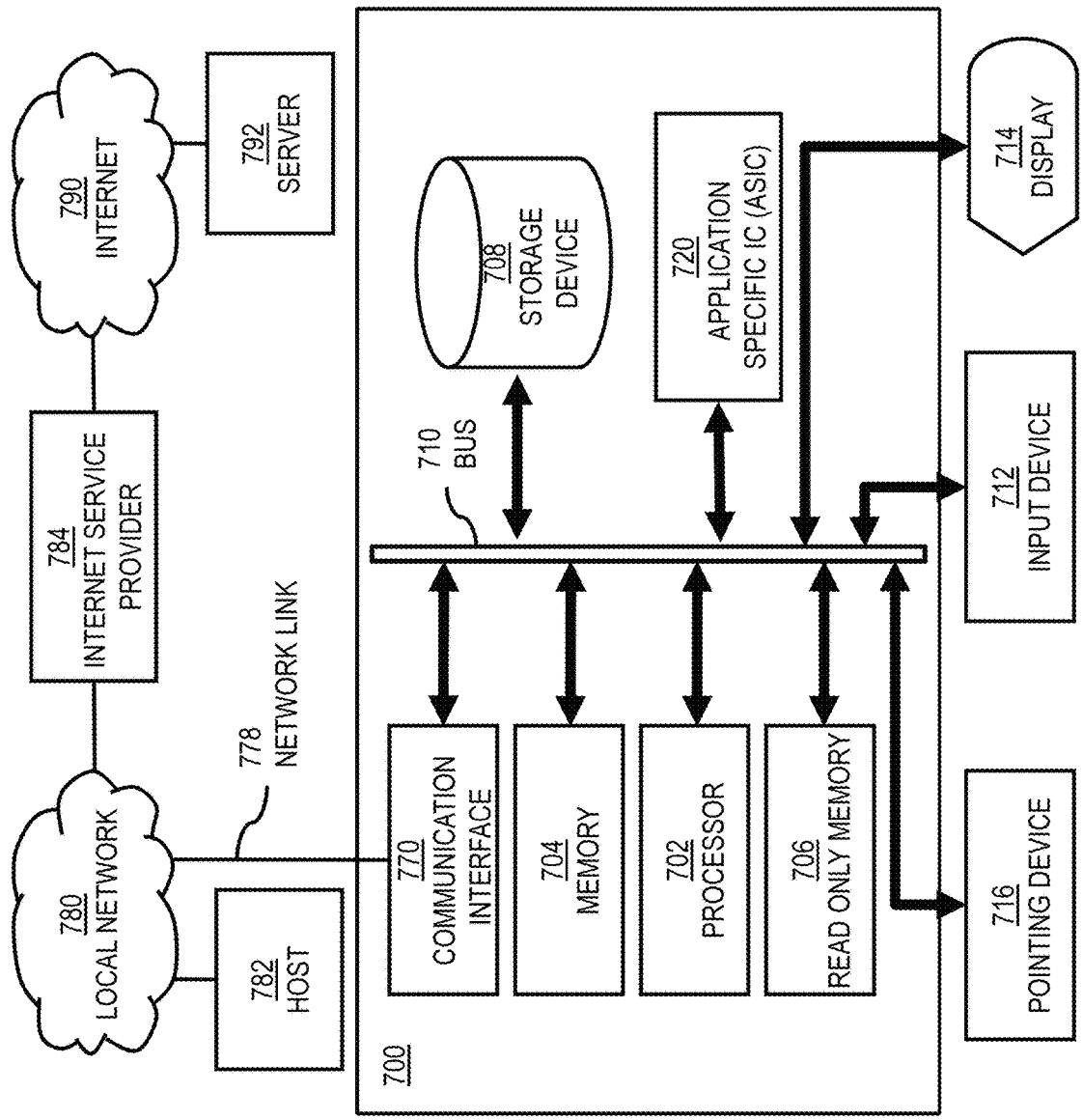
FIG. 7 is a diagram of hardware that can be used to implement an embodiment.

FIG. 7 illustrates a computer system 700 upon which an embodiment of the invention may be implemented. Computer system 700 is programmed (e.g., via computer program code or instructions) to provide trajectory anonymization using negative gaps as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to providing trajectory anonymization using negative gaps. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RANI) or other dynamic storage device, stores information including processor instructions for providing trajectory anonymization using negative gaps. Dynamic memory allows information stored therein to be changed by the computer system 700. RANI allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk, or flash card, for storing information, including instructions, that persists even when the computer system 700 is turned off or otherwise loses power.

Information, including instructions for providing trajectory anonymization using negative gaps, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners, and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic, or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 127 for providing trajectory anonymization using negative gaps.

The term computer-readable medium is used herein to refer to any medium that participates in providing information to processor 702, including instructions for execution. Such a medium may take many forms, including, but not limited to, non-volatile media, volatile media, and transmission media. Non-volatile media include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system can be deployed in various configurations within other computer systems, e.g., host 782 and server 792.

FIG. 8 illustrates a chip set 800 upon which an embodiment of the invention may be implemented. Chip set 800 is programmed to provide trajectory anonymization using negative gaps as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide trajectory anonymization using negative gaps. The memory 805 also stores the data associated with or generated by the execution of the inventive steps.

Figure 9:
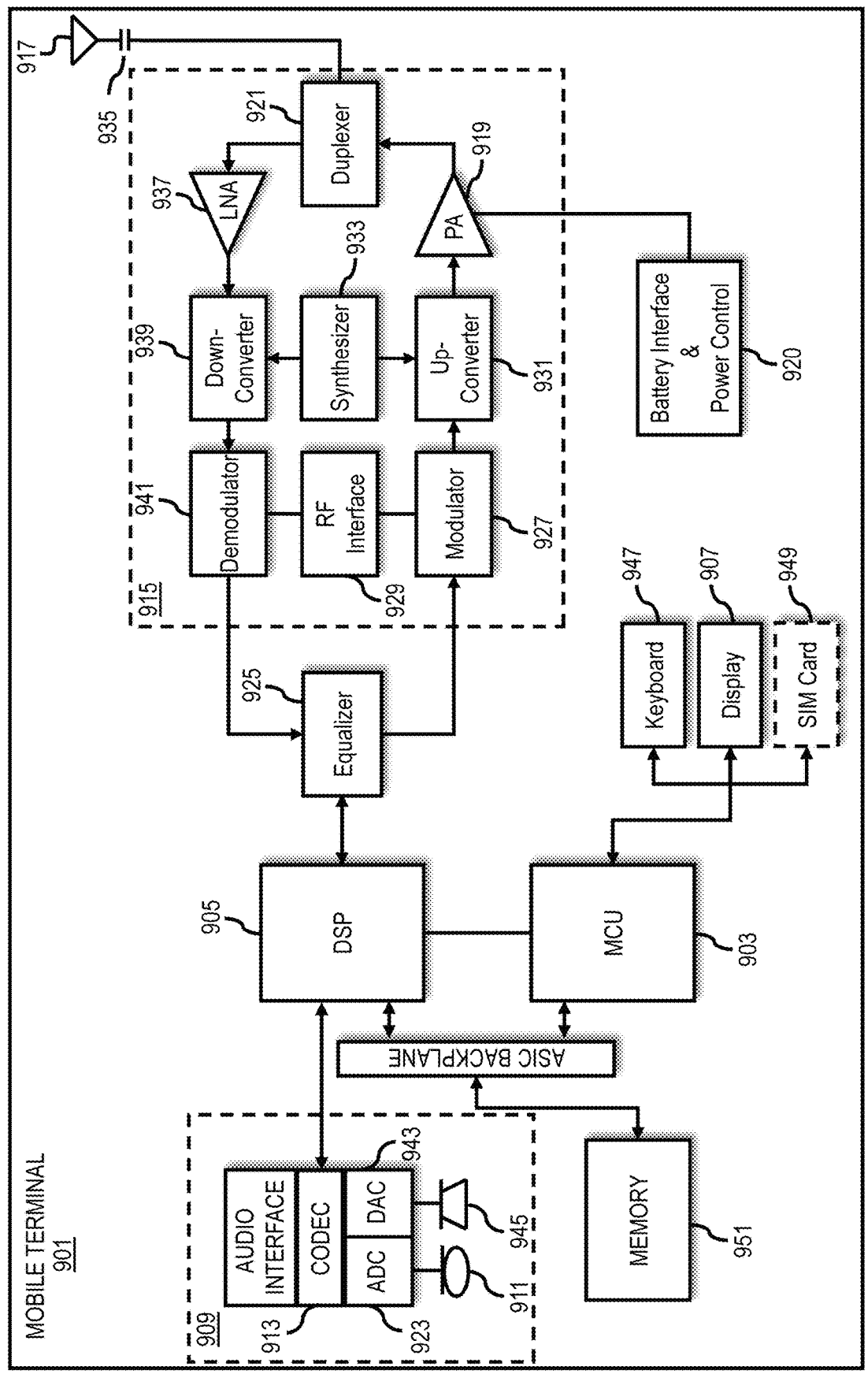
FIG. 9 is a diagram of a mobile terminal that can be used to implement an embodiment.

FIG. 9 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile station functions that offer automatic contact matching. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile station 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile station 901 to provide trajectory anonymization using negative gaps. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the station. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile station 901.

The CODEC 913 includes the ADC 923 and DAC 943. The memory 951 stores various data including call incoming tone data and is capable of storing other data including music data received via, e.g., the global Internet. The software module could reside in RANI memory, flash memory, registers, or any other form of writable computer-readable storage medium known in the art including non-transitory computer-readable storage medium. For example, the memory device 951 may be, but not limited to, a single memory, CD, DVD, ROM, RAM, EEPROM, optical storage, or any other non-volatile or non-transitory storage medium capable of storing digital data.

An optionally incorporated SIM card 949 carries, for instance, important information, such as the cellular phone number, the carrier supplying service, subscription details, and security information. The SIM card 949 serves primarily to identify the mobile station 901 on a radio network. The card 949 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    receiving a probe trajectory generated from at least one sensor of a probe device;
    processing the probe trajectory to segment the probe trajectory into a first subtrajectory and a second subtrajectory based on a negative gap between the first subtrajectory and the second subtrajectory, wherein the negative gap specifies an amount of overlap between the end of the first subtrajectory and the beginning of the second subtrajectory;
    assigning a first pseudonym to the first subtrajectory, and a second pseudonym to the second subtrajectory;
    subsampling the first subtrajectory at a first sampling rate, the second subtrajectory at a second sampling rate, or a combination thereof; and
    providing the first subtrajectory and the second subtrajectory as a trajectory anonymization output, wherein the subsampled first subtrajectory, the subsampled second subtrajectory, or a combination thereof is provided as the trajectory anonymization output.

2. The method of claim 1, further comprising:
    determining a random gap length for the amount of overlap of the negative gap.

3. The method of claim 2, wherein the random gap length is determined from a specified range of values.

4. The method of claim 1, further comprising:
determining a trajectory length for segmenting the probe trajectory into the first subtrajectory and the second subtrajectory.

5. The method of claim 4, further comprising:
determining a random trajectory length for the trajectory length,
wherein the random trajectory length is determined from a specified range of values.

6. The method of claim 1, further comprising:
applying a temporal offset to the first subtrajectory, the second subtrajectory, or a combination thereof.

7. The method of claim 6, wherein the temporal offset is random or constant.

8. The method of claim 1, further comprising:
after the subsampling of the first subtrajectory, erasing one or more probe points in the second subtrajectory that overlap with the subsampled first trajectory; and
initiating the subsampling the second subtrajectory with the erased one or more probe points to generate the subsampled second subtrajectory.

9. The method of claim 1, further comprising:
decomposing the probe trajectory into a first parallel track and a second parallel track with an offset between the first parallel track and the second parallel track,
wherein the first subtrajectory is segmented from the first parallel track and the second subtrajectory is a segmented from the second parallel track.

10. The method of claim 9, wherein the first parallel track and the second parallel track are parallel point-disjoint subtrajectories.

11. The method of claim 9, wherein the first parallel track is sampled from the probe trajectory at a first sampling rate, and the second parallel track is sampled from the probe trajectory at a second sampling rate.

12. The method of claim 1, wherein the negative gap is specified as a temporal value, a distance value, or a combination thereof.

13. An apparatus comprising:
at least one processor; and
at least one memory including computer program code for one or more programs,
the at least one memory and the computer program code configured to, with the at least one processor, cause the apparatus to perform at least the following,
receive a probe trajectory generated from at least one sensor of a probe device;
process the probe trajectory to segment the probe trajectory into a first subtrajectory and a second subtrajectory based on a negative gap between the first subtrajectory and the second subtrajectory, wherein the negative gap specifies an amount of overlap between the end of the first subtrajectory and the beginning of the second subtrajectory;
decompose the probe trajectory into a first parallel track and a second parallel track with an offset between the first parallel track and the second parallel track,
wherein the first subtrajectory is segmented from the first parallel track and the second subtrajectory is a segmented from the second parallel track;
assign a first pseudonym to the first subtrajectory, and a second pseudonym to the second subtrajectory; and
provide the first subtrajectory and the second subtrajectory as a trajectory anonymization output.

14. The apparatus of claim 13, wherein the apparatus is further caused to:
subsample the first subtrajectory at a first sampling rate, the second subtrajectory at a second sampling rate, or a combination thereof,
wherein the subsampled first subtrajectory, the subsampled second subtrajectory, or a combination thereof is provided as the trajectory anonymization output.

15. The apparatus of claim 14, wherein the apparatus is further caused to:
after the subsampling of the first subtrajectory, erase one or more probe points in the second subtrajectory that overlap with the subsampled first trajectory; and
initiate the subsampling the second subtrajectory with the erased one or more probe points to generate the subsampled second subtrajectory.

16. A non-transitory computer readable storage medium including one or more sequences of one or more instructions which, when executed by one or more processors, cause an apparatus to at least perform:
receiving a probe trajectory generated from at least one sensor of a probe device;
processing the probe trajectory to segment the probe trajectory into a first subtrajectory and a second subtrajectory based on a negative gap between the first subtrajectory and the second subtrajectory, wherein the negative gap specifies an amount of overlap between the end of the first subtrajectory and the beginning of the second subtrajectory;
assigning a first pseudonym to the first subtrajectory, and a second pseudonym to the second subtrajectory;
subsampling the first subtrajectory at a first sampling rate, the second subtrajectory at a second sampling rate, or a combination thereof; and
providing the first subtrajectory and the second subtrajectory as a trajectory anonymization output, wherein the subsampled first subtrajectory, the subsampled second subtrajectory, or a combination thereof is provided as the trajectory anonymization output.

17. The non-transitory computer readable storage medium of claim 16, wherein the apparatus is caused to further perform:
after the subsampling of the first subtrajectory, erasing one or more probe points in the second subtrajectory that overlap with the subsampled first trajectory; and
initiating the subsampling the second subtrajectory with the erased one or more probe points to generate the subsampled second subtrajectory.

18. The non-transitory computer readable storage medium of claim 16, wherein the apparatus is caused to further perform:
decomposing the probe trajectory into a first parallel track and a second parallel track with an offset between the first parallel track and the second parallel track,
wherein the first subtrajectory is segmented from the first parallel track and the second subtrajectory is a segmented from the second parallel track.

* * * * *